(12) United States Patent
Kash

(10) Patent No.: US 8,714,985 B1
(45) Date of Patent: May 6, 2014

(54) TAXIDERMIC METHOD FOR GAME-HEAD MOUNTING

(76) Inventor: Barry G. Kash, Waltonville, IL (US)

(*) Notice: Subject to any disclaimer, the term of this patent is extended or adjusted under 35 U.S.C. 154(b) by 2160 days.

(21) Appl. No.: 11/682,173

(22) Filed: Mar. 5, 2007

(51) Int. Cl.
    *G09B 23/26* (2006.01)
    *G09B 23/28* (2006.01)
    *G09B 23/36* (2006.01)

(52) U.S. Cl.
    CPC ............... *G09B 23/26* (2013.01); *G09B 23/28* (2013.01); *G09B 23/36* (2013.01)
    USPC ........................................ 434/296; 434/295

(58) Field of Classification Search
    CPC ......... G09B 23/26; G09B 23/28; G09B 23/36
    USPC ................................................ 434/295, 296
    See application file for complete search history.

(56) References Cited

U.S. PATENT DOCUMENTS

| | | | |
|---|---|---|---|
| 2,992,494 A * | 7/1961 | Jonas, Jr. ...................... | 434/296 |
| 3,780,452 A | 12/1973 | Jackson | |
| 3,876,321 A * | 4/1975 | Haines ......................... | 403/396 |
| 4,544,361 A * | 10/1985 | Van Veen et al. .............. | 434/296 |
| 5,149,271 A * | 9/1992 | Marvich ....................... | 434/295 |
| 5,350,670 A | 9/1994 | Yeh | |
| 5,567,161 A * | 10/1996 | Kallina ......................... | 434/295 |
| 5,733,130 A | 3/1998 | Eppley | |
| 6,561,468 B2 * | 5/2003 | Williamson ................... | 434/295 |
| 7,207,535 B1 * | 4/2007 | Giuliani ........................ | 434/296 |
| 8,308,488 B2 * | 11/2012 | Eppley .......................... | 434/295 |
| 2009/0075245 A1 * | 3/2009 | Hacke ........................... | 434/296 |

OTHER PUBLICATIONS

Farnham AB. Home Taxidermy for Pleasure and Profit. [online] (1944 Ed.) [retrieved Feb. 17, 2010] Retrieved from How-To-Taxidermy.com via Internet <URL:http://www.how-to-taxidermy.com/>.*

* cited by examiner

*Primary Examiner* — Nikolai A Gishnock
(74) *Attorney, Agent, or Firm* — Grace J. Fishel

(57) ABSTRACT

A taxidermic method for game-head mounting. A retainer is provided for keeping an ear supported by an ear liner properly posed on a mannikin while the game-head is drying. The retainer has an upwardly extending substantially straight stem portion having an upper end portion downwardly bent into a substantially straight right angle arm. The arm has a lower end portion bent upwardly into a U-shaped hook portion for holding a rim of the ear supported by the ear liner during drying of a cape on the mannikin.

8 Claims, 3 Drawing Sheets

TAXIDERMIC METHOD FOR GAME-HEAD MOUNTING

BACKGROUND OF THE INVENTION

1. Field of the Invention

The present invention relates to a taxidermic method for game-head mounting. More particularly, the present invention relates to a method for keeping an ear supported by an ear liner properly posed on a mannikin while a cape is drying.

2. Brief Description of the Prior Art

Taxidermic preparation of a game-head includes skinning the head to remove the cape and sawing of the crown of the skull if the head includes antlers. The cape is fleshed and the cartilage in the ears removed. After the cape has been tanned, it may be dry mounted on a mannikin but soaking the cape in lukewarm water makes mounting easier.

In mounting the game head, the antlers are attached to a mannikin and an ear liner is inserted into each ear to take the place of the cartilage and muscle which was removed. The cape is then glued onto the mannikin.

Ear liners may be provided with a butt for attachment to the mannikin in a position fixed by a connection between the ear liner and the mannikin. Buttless ear liners, however, give the taxidermist more flexibility in positioning the ear. With this style of ear liner, potter's clay is packed around the base of the ear liner to simulate the muscle and cartilage which was removed. Potter's clay may also be used inside the aural canal of the ear to secure the ear to the mannikin. Potter's clay is the same material that is used in ceramics work; it is easy to model but dries hard in a permanent shape. Critter Clay™, for example, is a potter's clay that was developed for the taxidermy trade.

While potter's clay allows the taxidermist great flexibility in positioning the ear, it takes several days for the clay to dry. During this time, the cape is also drying if it was mounted wet and the ears may be pulled out of the desired position. When the game-head has antlers, some taxidermists tie the ears to the antlers. This provides support but it may also cause the ears to move out of the desired position as the clay and the cape dries or shrinks.

BRIEF SUMMARY OF THE INVENTION

In view of the above, it is an object of the present invention to provide a taxidermic method for keeping an ear supported by an ear liner properly posed on a mannikin while a cape is drying. Other objects and features of the invention will be in part apparent and in part pointed out hereinafter.

In accordance with the invention, a method for game-head mounting is provided for keeping an ear supported by an ear liner properly posed in a desired position on a mannikin while a cape is drying. For this purpose a retainer is provided comprising a relatively stiff wire rod formed into the shape of an upwardly extending substantially straight stem portion having an upper end portion downwardly bent into a substantially straight right angle arm. The right angle arm has a lower end portion bent upwardly into an upwardly facing U-shaped hook having one leg formed by the arm and a short leg extending upwardly adjacent the arm portion. The leg portions are spread apart for holding a rim of the ear supported by the ear liner.

After the ear supported by the ear liner is positioned by a taxidermist in a desired position, the stem portion of the retainer is passed through an aural canal of the ear and into the mannikin. The U-shaped hook portion is hooked around the rim of the ear such that the ear is supported by the U-shaped hook while the cape and/or clay dries.

The invention summarized above comprises the methods hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
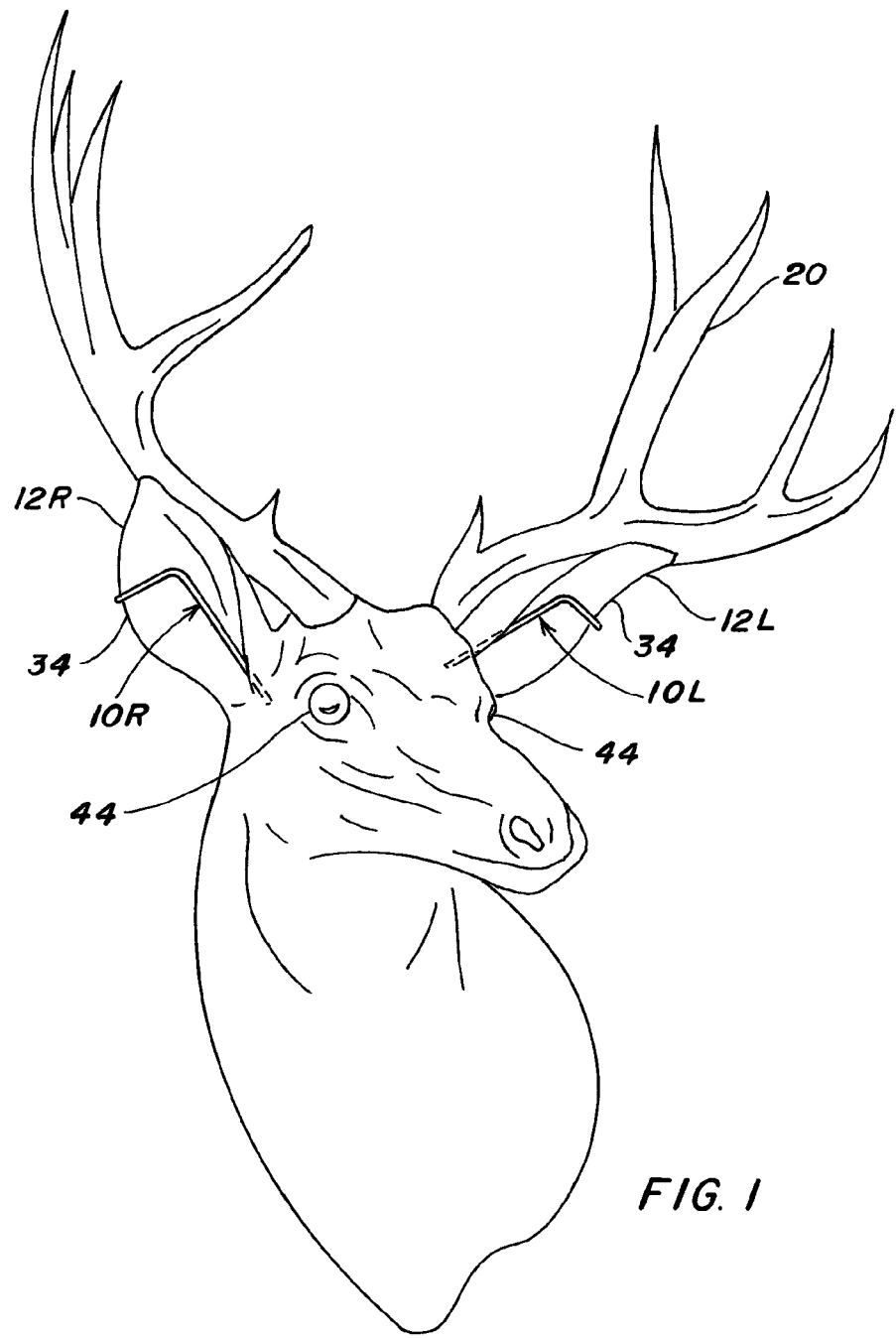
FIG. 1 is a perspective view of a game-head with the ears supported by a retainer in accordance with the present invention.

Referring to the drawings more particularly by reference character, a retainer 10R, 10L is used for keeping ears 12R, 12L supported by an ear liner 14 properly posed on a mannikin 16 while a cape 18 is drying. The present method may be used with game having antlers or horns as well as big-game animals such as bear.

Figure 2:
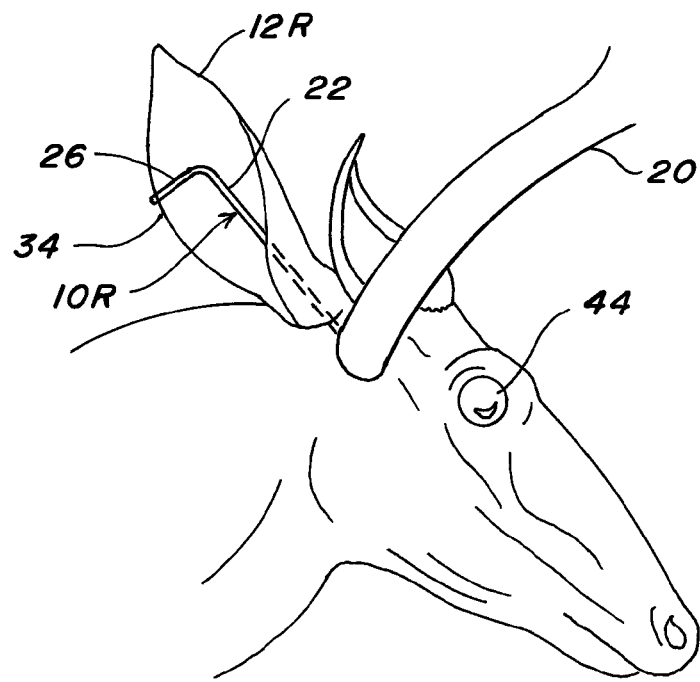
FIG. 2 is a right side elevation of the game-head shown in FIG. 1.
Figure 3:
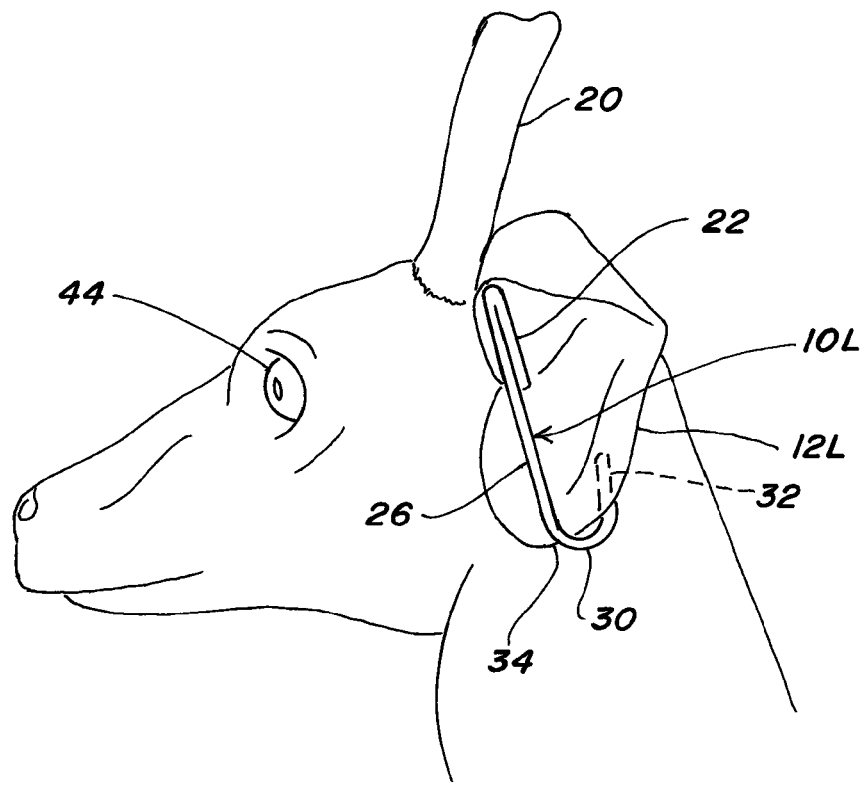
FIG. 3 is a left side elevation of the game-head shown in FIG. 1.
Figure 4:
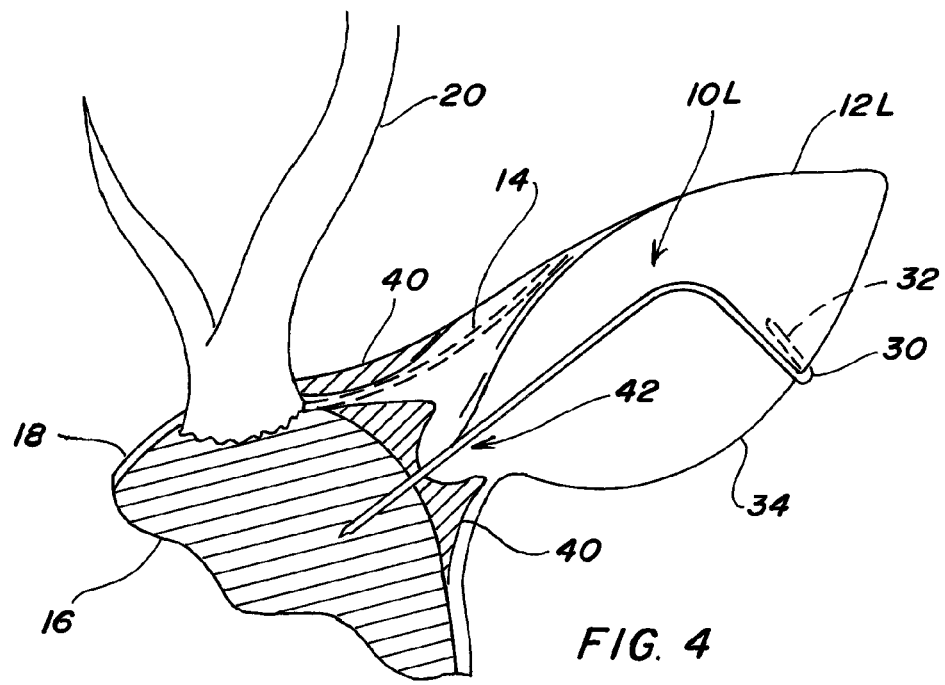
FIG. 4 is a cross-section of the mannikin supporting the game-head, a cross-section of the ear liner supporting the ears and a perspective view of the retainer supporting the ear liner.

As shown in FIGS. 1-3, retainers 10R, 10L are illustrated for head-mounting a whitetail deer with ears 12R, 12L at a relaxed angle, allowing antlers 20 to appear large relative to the ears. Retainer 10R and retainer 10L are mirror images of each other for use on right and left ears 12R, 12L, respectively.

Figure 5:
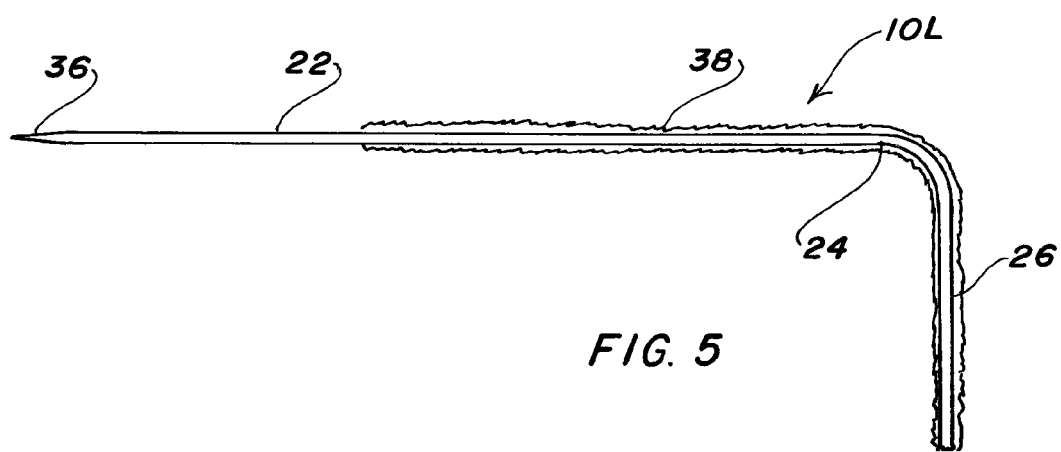
FIG. 5 is a side elevation of the retainer.
Figure 6:
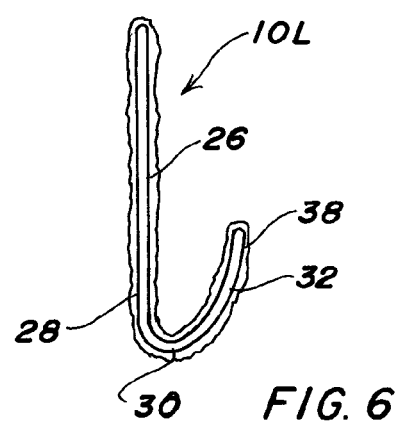
FIG. 6 is an end view of the retainer.

Each retainer 10R, 10L comprises a bendable, but relatively stiff wire rod, formed in the shape of an upwardly extending elongated substantially straight stem portion 22. An upper end portion 24 of stem portion 22 is downwardly bent into a substantially straight right angle arm 26. A lower end portion 28 of arm 26 is then bent upwardly into an upwardly facing U-shaped hook 30 having one leg formed by arm 26 and having a short leg 32 extending upwardly adjacent arm (FIG. 6). The leg portions of U-shaped hook 30 are spread apart for holding a rim 34 of ear 12R, 12L supported by ear liner 14. As shown in FIGS. 5 and 6, U-shaped hook 30 is in a plane substantially orthogonal to a plane containing stem portion 22 and right angle arm 26.

The gauge of the wire forming retainer 10R, 10L and the length of stem portion 22, arm 26 and short leg 32 depend upon the game being mounted. For whitetail deer as shown in FIGS. 1-3, 0.09375 inch wire with stem portion 22, 5 inches long, arm 26, 1½ inches and short leg 32, ½ inches is suitable. Examples of other retainers 10R, 10L include:

| Wire Size | Stem Portion 22 | Arm 26 | Short Leg 32 |
| --- | --- | --- | --- |
| 0.09375 | 6 | 2 | 3/4 |
| 0.09375 | 7 | 2 | 3/4 |
| 0.125 | 9 | 3 | 3/4 |

While specific measurements have been provided, it will be understood that the size of the rod and length of the elements making up retainer 10R, 10L may vary.

As seen in FIGS. 5 and 6, a lower end portion 36 of stem portion 22 may be formed with a sharpened or pointed end which assists in penetrating mannikin 16 when stem portion 22 is inserted into the head form, most of which are made of polyurethane. The wire rod out of which retainer 10R, 10L is formed may be made of stainless steel and may be provided with a plastic coating 38 above sharpened lower end portion 36.

Before ear liner 14 is inserted into right and left ears 12R, 12L, glue is applied to mannikin 16 and potter's clay 40 applied about the base of ear liner 14 and inside aural canal 42 of ears 12R, 12L. Ears 12R, 12L are positioned by the taxidermist in a desired position, e.g., relaxed as shown in FIGS. 1-3, alert ears-forward, etc.

After ears 12R, 12L are positioned, sharpened lower end portion 36 is inserted through aural canal 42 in mannikin 16. U-shaped hook 30 is then hooked about rim 34 of ears 12R, 12L as shown in the drawings. While cape 18 and potter's clay 40 dries, retainer 10R, 10L supports ears 12R, 12L in the desired position and resists gravity droop and any shrinking forces which might otherwise reposition the ears. This is important as movement of ears 12R, 12L may also result in movement of other features such as eyes 44 spoiling the work which has taken the taxidermist many hours to do.

In view of the above, it will be seen that the several objects of the invention are achieved and other advantageous results attained. As various changes could be made in the above methods without departing from the scope of the invention, it is intended that all matter contained in the above description or shown in the accompanying drawings shall be interpreted as illustrative and not in a limiting sense.

What is claimed:

1. A taxidermic method for keeping an ear supported by an ear liner properly posed in a desired position on a mannikin while a cape is drying, said method comprising:

providing a retainer comprising a bendable, but relatively stiff wire rod, formed in the shape of an upwardly extending elongated substantially straight stem portion having an upper end portion downwardly bent into a substantially straight, right angle arm, said arm having a lower end portion bent upwardly into an upwardly facing U-shaped hook having one leg formed by the arm portion and having a short leg extending upwardly adjacent the arm portion, said U-shaped hook in a plane substantially orthogonal to a plane containing the stem and the right angle arm, said leg portions spread apart for holding a rim of the ear supported by the ear liner, positioning the ear supported by the ear liner on a mannikin in a desired position while the cape dries;

passing the stem portion of the retainer through an aural canal of the ear and into the mannikin; and, hooking the U-shaped hook portion about the rim of the ear whereby the ear is supported by the U-shaped hook portion while the cape dries on the mannikin.

2. The taxidermic method of claim 1 further comprising straightening an ear pulled out of position by shrinkage of the cape during drying by bending the stem of the retainer such that the U-shaped hook again supports the ear in the desired position.

3. The taxidermic method of claim 1 wherein potter's clay is applied about the base of the ear liner to simulate cartilage and muscle removed from the ear, said retainer supporting the ear in the desired position while the potter's clay dries.

4. The taxidermic method of claim 3 wherein potter's clay is applied inside the aural canal of the ear, said retainer supporting the ear in the desired position while the potter's clay dries.

5. The taxidermic method of claim 1 wherein the retainer is formed of stainless steel.

6. The taxidermic method of claim 5 wherein the lower end of the stem is sharpened for insertion into the mannikin.

7. The taxidermic method of claim 6 wherein a plastic coating is applied to the retainer above the sharpened lower end of the stem.

8. The taxidermic method of claim 1 wherein a pair of retainers are provided to support right and left ears of the cape on the mannikin.

\* \* \* \* \*